United States Patent
Szucs

(10) Patent No.: US 10,827,134 B2
(45) Date of Patent: Nov. 3, 2020

(54) DECODER, ENCODER, AND ASSOCIATED METHODOLOGY FOR SUBTITLE TRANSMISSION AND RECEPTION

(71) Applicants: Sony Corporation, Tokyo (JP); Sony Europe B.V., Weybridge (GB)

(72) Inventor: Paul Szucs, Esslingen (DE)

(73) Assignees: Sony Corporation, Tokyo (JP); Sony Europe B.V., Weybridge (GB)

(*) Notice: Subject to any disclaimer, the term of this patent is extended or adjusted under 35 U.S.C. 154(b) by 0 days.

(21) Appl. No.: 16/318,270

(22) PCT Filed: Aug. 16, 2017

(86) PCT No.: PCT/GB2017/052424
§ 371 (c)(1),
(2) Date: Jan. 16, 2019

(87) PCT Pub. No.: WO2018/051058
PCT Pub. Date: Mar. 22, 2018

(65) Prior Publication Data
US 2019/0230298 A1    Jul. 25, 2019

(30) Foreign Application Priority Data
Sep. 13, 2016 (GB) .................... 1615535.0

(51) Int. Cl.
*H04N 5/278* (2006.01)
*H04N 19/46* (2014.01)
*H04N 7/025* (2006.01)
*H04N 21/488* (2011.01)
*H04N 7/088* (2006.01)

(52) U.S. Cl.
CPC .......... *H04N 5/278* (2013.01); *H04N 7/0255* (2013.01); *H04N 7/0885* (2013.01); *H04N 19/46* (2014.11); *H04N 21/4884* (2013.01)

(58) Field of Classification Search
None
See application file for complete search history.

(56) References Cited

U.S. PATENT DOCUMENTS

2003/0097657 A1* 5/2003 Zhou ................ H04N 7/163 725/46
2010/0293598 A1* 11/2010 Collart ............. H04H 20/38 726/3
2011/0298977 A1 12/2011 Sekiguchi

OTHER PUBLICATIONS

EBU Operating Eurovision, "Digital Video Broadcasting (DVB): Subtitling systems," vol. 1.5.1., Sep. 1, 2013.*

(Continued)

*Primary Examiner* — Edemio Navas, Jr.
(74) *Attorney, Agent, or Firm* — Oblon, McClelland, Maier & Neustadt, L.L.P.

(57) ABSTRACT

A subtitle encoding device for transmitting a bitmap subtitle for insertion in an image using a progressive type scan including a controller configured to: indicate, in an interlace subtitle system, that a top field block length is zero; and provide the bitmap subtitle in a bottom field of the interlace subtitle system.

5 Claims, 9 Drawing Sheets

(56) References Cited

OTHER PUBLICATIONS

International Search Report and Written Opinion dated Nov. 28, 2017 in PCT/GB2017/052424 filed Aug. 16, 2017.
Great British Search Report dated Mar. 9, 2017 in Great British Application No. GB 1615535.0 filed Sep. 13, 2016.
European Standard, "Digital Video Broadcasting (DVB); Subtitling systems," Retrieved from the Internet: http://www.etsi.org/deliver/etsi_en/300700_300799/300743/01.05.01_20/en_300743v010501a.pdf, vol. 1.5.1, Sep. 1, 2013, (63 total pages), XP055426623.

* cited by examiner

| Syntax | Size | Type |
|---|---|---|
| object_data_segment(){ | | |
|     sync_byte | 8 | bslbf |
|     segment_type | 8 | bslbf |
|     page_id | 16 | bslbf |
|     segment_length | 16 | uimsbf |
|     object_id | 16 | bslbf |
|     object_version_number | 4 | uimsbf |
|     object_coding_method | 2 | bslbf |
|     non_modifying_colour_flag | 1 | bslbf |
|     reserved | 1 | bslbf |
|     if (object_coding_method == '00'){ | | |
|         top_field_data_block_length | 16 | uimsbf |
|         bottom_field_data_block_length | 16 | uimsbf |
|         while(processed_length<top_field_data_block_length) | | |
|             pixel-data_sub-block() | | |
|         while (processed_length<bottom_field_data_block_length) | | |
|             pixel-data_sub-block() | | |
|         if (!wordaligned()) | | |
|             8_stuff_bits | 8 | bslbf |
|     } | | |
|     if (object_coding_method == '01'){ | | |
|         number of codes | 8 | uimsbf |
|         for (i == 1, i <= number of codes, i ++) | | |
|             charcter_code | 16 | bslbf |
|     } | | |
| } | | |

FIG. 5

| Syntax | Size | Type |
|---|---|---|
| object_data_segment(){ | | |
|     sync_byte | 8 | bslbf |
|     segment_type | 8 | bslbf |
|     page_id | 16 | bslbf |
|     segment_length | 16 | uimsbf |
|     object_id | 16 | bslbf |
|     object_version_number | 4 | uimsbf |
|     object_coding_method | 2 | bslbf |
|     non_modifying_colour_flag | 1 | bslbf |
|     progressive_scan_bitmap | 1 | bslbf |
|     if (object_coding_method == '00'){ | | |
|         top_field_data_block_length | 16 | uimsbf |
|         bottom_field_data_block_length | 16 | uimsbf |
|         while(processed_length<top_field_data_block_length) | | |
|             pixel-data_sub-block() | | |
|         while (processed_length<bottom_field_data_block_length) | | |
|             pixel-data_sub-block() | | |
|         if (!wordaligned()) | | |
|             8_stuff_bits | 8 | bslbf |
|     } | | |
|     if (object_coding_method == '01'){ | | |
|         number of codes | 8 | uimsbf |
|         for (i == 1, i <= number of codes, i ++) | | |
|             charcter_code | 16 | bslbf |
|     } | | |
| } | | |

FIG. 7

DECODER, ENCODER, AND ASSOCIATED METHODOLOGY FOR SUBTITLE TRANSMISSION AND RECEPTION

BACKGROUND

Field of the Disclosure

The present technique relates to a decoder, encoder, computer program and method.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

It is known to transmit subtitles as either text or as bitmaps. In the case of bitmaps, the mechanism for transmitting these subtitles is set out in [1]. However, in this Standard the bitmaps are transmitted as an interlaced-type scan. Therefore, at the transmission side, if the bitmaps are progressive scanned, the transmission side needs to separate out the odd and even lines into two separate data blocks for carriage in the object_data_segment according to [1]. Similarly, in the decoder, the odd and even lines of subtitle bitmap pixel data must be extracted from the object_data_segment sent according to [1] and re-combined in a progressive type scan for display.

Of course, as there are many situations where interlaced type scan still occurs, and for backward compatibility of devices, it is desirable to transmit subtitle bitmaps as progressive scan using the framework set out in [1].

It is an aim of the disclosure to address this issue.

SUMMARY

According to embodiments of the disclosure, there is provided a subtitle encoding device for transmitting a bitmap subtitle for insertion in an image using a progressive type scan comprising a controller configured to: indicate, in an interlace subtitle system, that a top field block length is zero; and provide the bitmap subtitle in a bottom field of the interlace subtitle system.

Other features and embodiments may be generally written as in the following claims appended hereto.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 shows the syntax of the object_data_segment using the interlaced type scan;

FIG. 7 shows the object_data_segment structure 700 according to embodiments of the disclosure;

DESCRIPTION OF THE EMBODIMENTS

Figure 1:
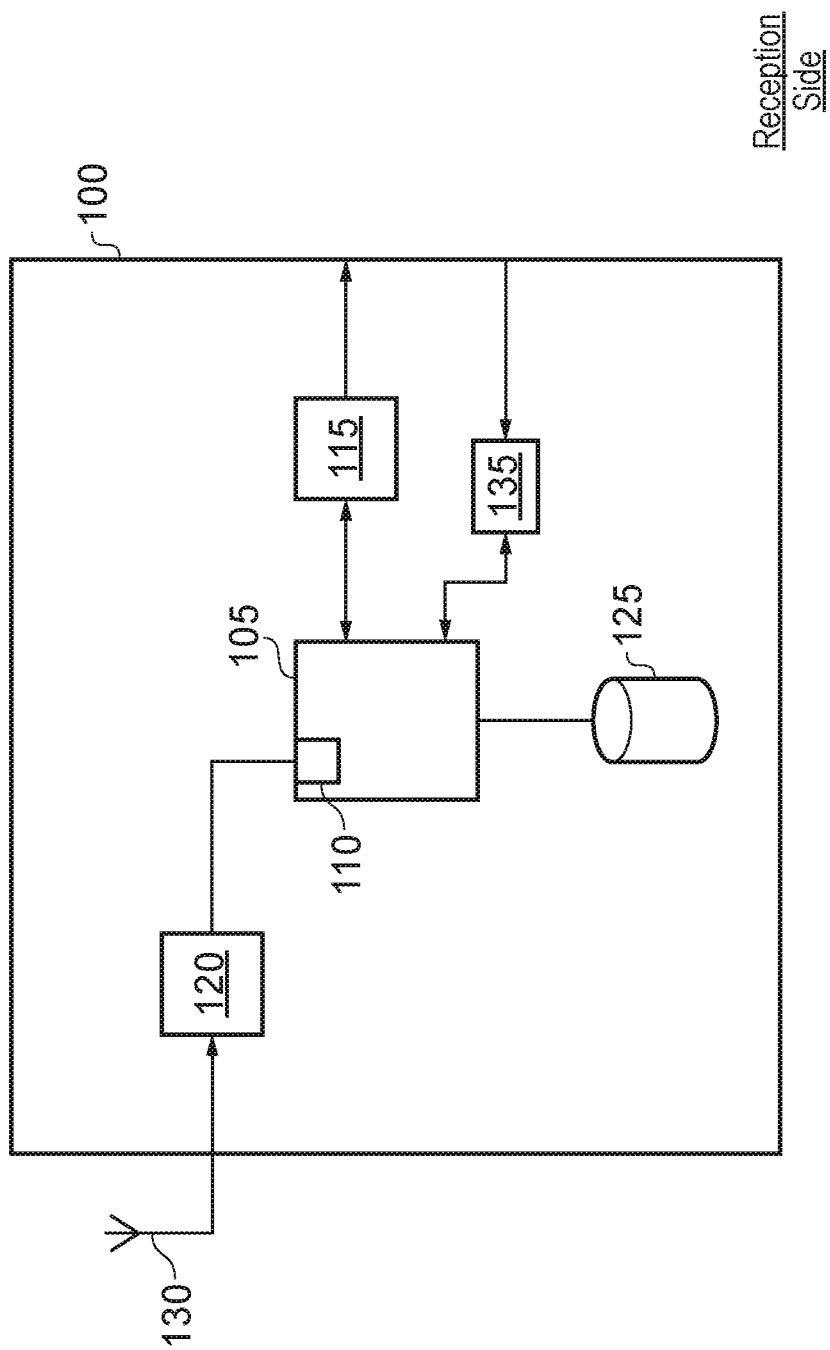
FIG. 1 shows a television receiver 100 according to embodiments of the present disclosure.

Referring now to the drawings, wherein like reference numerals designate identical or corresponding parts throughout the several views.

FIG. 1 shows a television receiver 100 according to embodiments of the present disclosure. The television receiver 100 may be a set-top box receiving terrestrial television, cable television or satellite television, or may be a device receiving television services via a data connection such as broadband Internet connection, or via a mobile communication network. The television receiver 100 may be integrated into a television display device or an optical disc reader such as a Blu-Ray or DVD player. Alternatively, the television receiver may be integrated into a games console, Personal Computer or any kind of suitable device. The television receiver may take the form of a software application that is executed on a hand-held device or on any of the aforementioned device types.

The operation of the television receiver 100 is controlled by a controller 105. The controller 105 may take the form of a controller circuitry which is typically made of semiconductor material and which runs under the control of computer software embodied as computer readable code. This code may be stored within the controller 105 or may be stored elsewhere within the television receiver 100. In this specific example, the computer software is stored within storage medium 125 which is connected to the controller 105. Storage medium 125 may be formed of any kind of suitable media such as solid-state storage or magnetic or optical readable media. Other data such as user profile information, application data, and content may be also stored on storage medium 125.

Also connected to controller 105 is a television decoder 120. The television decoder 120 may take the form of communication circuitry which is configured to receive television signals encoded using the Digital Video Broadcasting (DVB) set of Standards. In embodiments, the encoded television signals may be broadcast or delivered in a multicast or unicast mode over a terrestrial link, a cable link, satellite link, broadband internet connection or over a cellular (mobile telephone) network.

The television decoder 120 is connected to an antenna 130 which allows these television signals to be received. The antenna 130 may take the form of a Yagi and log-periodic type antenna or a satellite dish, cable head-end or any kind of appropriate reception device. In some television decoder device embodiments, the antenna takes the form of a modem that receives television signals from a cable connection, for example a broadband Internet connection.

The controller 105 is also connected to a user input module 135. The user input module 135 may be a remote control or commander, touchscreen, stylus, keyboard, mouse, gesture recognition system or any kind of device suitable to allow the user to control the operation of the television receiver 100.

The controller 105 is also connected to a user output module 115. The user output module 115 may be a display (into which the television receiver is integrated or connected), wearable technology such as a smart-watch or goggles, or any kind of device suitable to allow the user to receive the televisual output of the television receiver 100.

Within the controller 105 is a subtitle decoder 110 which may be integrated to, or separate from the controller 105. The operation of the subtitle decoder 110 is controlled by controller 105 and its operation will be described later. The subtitle decoder 110, like the controller 105 may be embodied as circuitry and may be controlled by software stored on storage medium 125.

Figure 2:
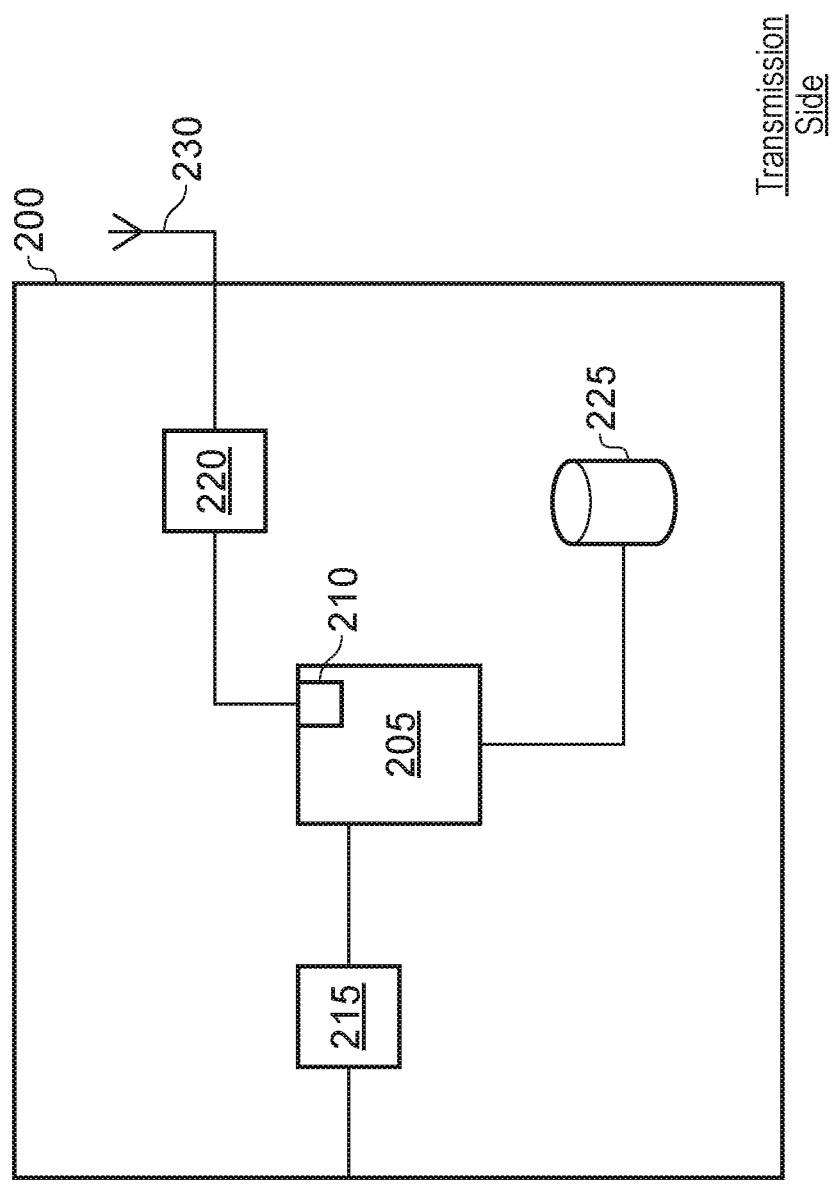
FIG. 2 shows a television transmission device 200 according to embodiments of the present disclosure

FIG. 2 shows a television transmission device 200 according to embodiments of the present disclosure. The television transmission device 200 may be a delivery system transmitting terrestrial television, cable television or satellite television.

The operation of the television transmission device 200 is controlled by a controller 205. The controller 205 may take the form of a controller circuitry which is typically made of semiconductor material and which runs under the control of computer software embodied as computer readable code. This code may be stored within the controller 205 or may be stored elsewhere within the television transmission device 200. In this specific example, the computer software is stored within storage medium 225 which is connected to the controller 205. Storage medium 225 may be formed of any kind of suitable media such as solid-state storage or magnetic or optical readable media. Other data such as user profile information, application data, and content may be also stored on storage medium 225.

Also connected to controller 205 is a television encoder 220. The television encoder 220 may take the form of communication circuitry which is configured to transmit television signals encoded using the Digital Video Broadcasting (DVB) Standard. In embodiments, the encoded television signals may be delivered over a terrestrial link, a cable link, satellite link, broadband Internet connection or over a cellular (mobile telephone) network.

The television encoder 220 is connected to an antenna 230 which allows these television signals to be transmitted or broadcast. For wireline based delivery systems the antenna is replaced by a modem, switch, server, or Content Delivery Network.

The controller 205 is also connected to a user input module 235. The user input module 235 may be a remote control or commander, touchscreen, stylus, keyboard, mouse, gesture recognition system or any kind of device suitable to allow the user to control the operation of the television transmission device 200.

The controller 205 is also connected to a user output module 215. The user output module 215 may be a display (into which the television receiver is integrated or connected), wearable technology such as a smart-watch or goggles, or any kind of device suitable to allow the user to view the televisual output of the television transmission device 200.

Within the controller 205 is a subtitle encoder 210 which may be integrated to, or separate from the controller 205. The operation of the subtitle encoder 210 is controlled by controller 205 and its operation will be described later. The subtitle encoder 210, like the controller 205 may be embodied as circuitry and may be controlled by software stored on storage medium 225.

Figure 3:
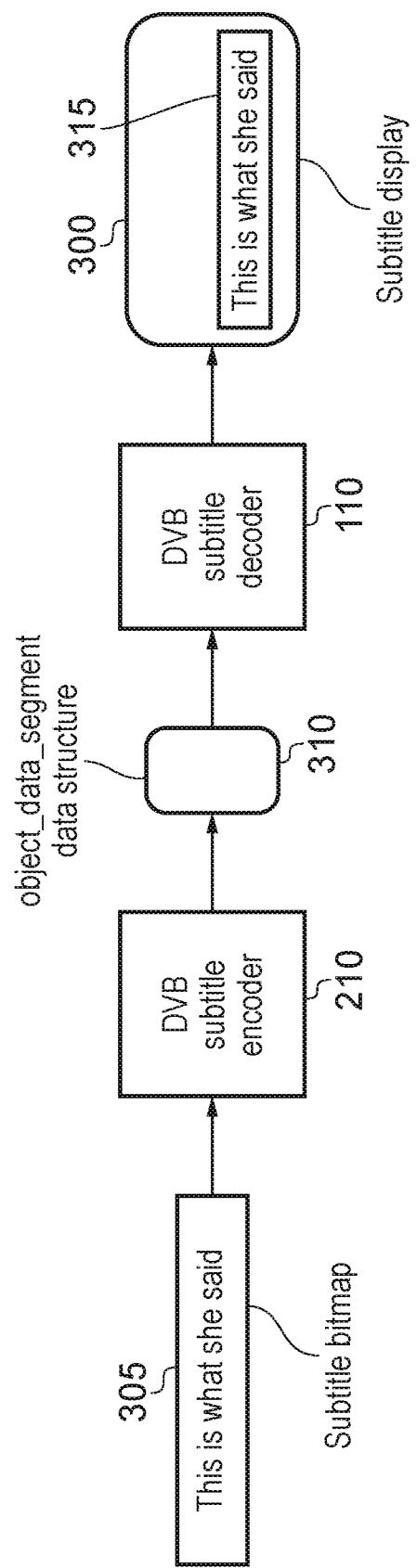
FIG. 3 shows a schematic diagram of the process 300 of subtitle bitmap encoding, carriage and decoding according to the subtitling specification set out in [1]

FIG. 3 shows a schematic diagram of the process 300 of subtitle bitmap encoding, carriage and decoding according to the subtitling specification set out in [1]. For the avoidance of doubt, the subject matter of [1] is incorporated herein by reference.

The process 300 has a subtitle bitmap 305 which is to be overlaid on the televisual content. In the depicted example the bitmap is a graphical representation of the text "This is what she said". Of course, the bitmap may be any graphical representation such as other words, pictures, logos or the like. The bitmap 305 is fed into the subtitle encoder 210 of FIG. 2. The bitmap is encoded within the subtitle encoder 210. In the known system, the subtitle encoder encodes the bitmap into an interlaced-scan type coding. However, in embodiments of the disclosure the subtitle encoder 210 encodes the bitmap straight into a progressive scan-type coding as will be explained later.

The televisual content is multiplexed with the subtitle bitmap is then transmitted or broadcast in block 310 to television receiver 100. In some embodiments the subtitle bitmaps in their encoded form are delivered separately from the televisual content, for example via an Internet connection, and re-combined and synchronised with the televisual content within the television receiver 100. The televisual content is received and decoded within the television receiver 100 and the subtitle bitmap is decoded by the subtitle decoder 110. In the known system, the interlace scan-type coding is decoded and if the display is a progressive type display, the television receiver 100 needs to perform appropriate transformation from the interlaced type scan to progressive scan. However, in embodiments of the present disclosure, the subtitle decoder 110 will receive the subtitle bitmap encoded in a progressive scan-type coding and so this further transformation step within the television receiver 100 is not required. The televisual content including the subtitle bitmap is then displayed in step 315.

Figure 4:
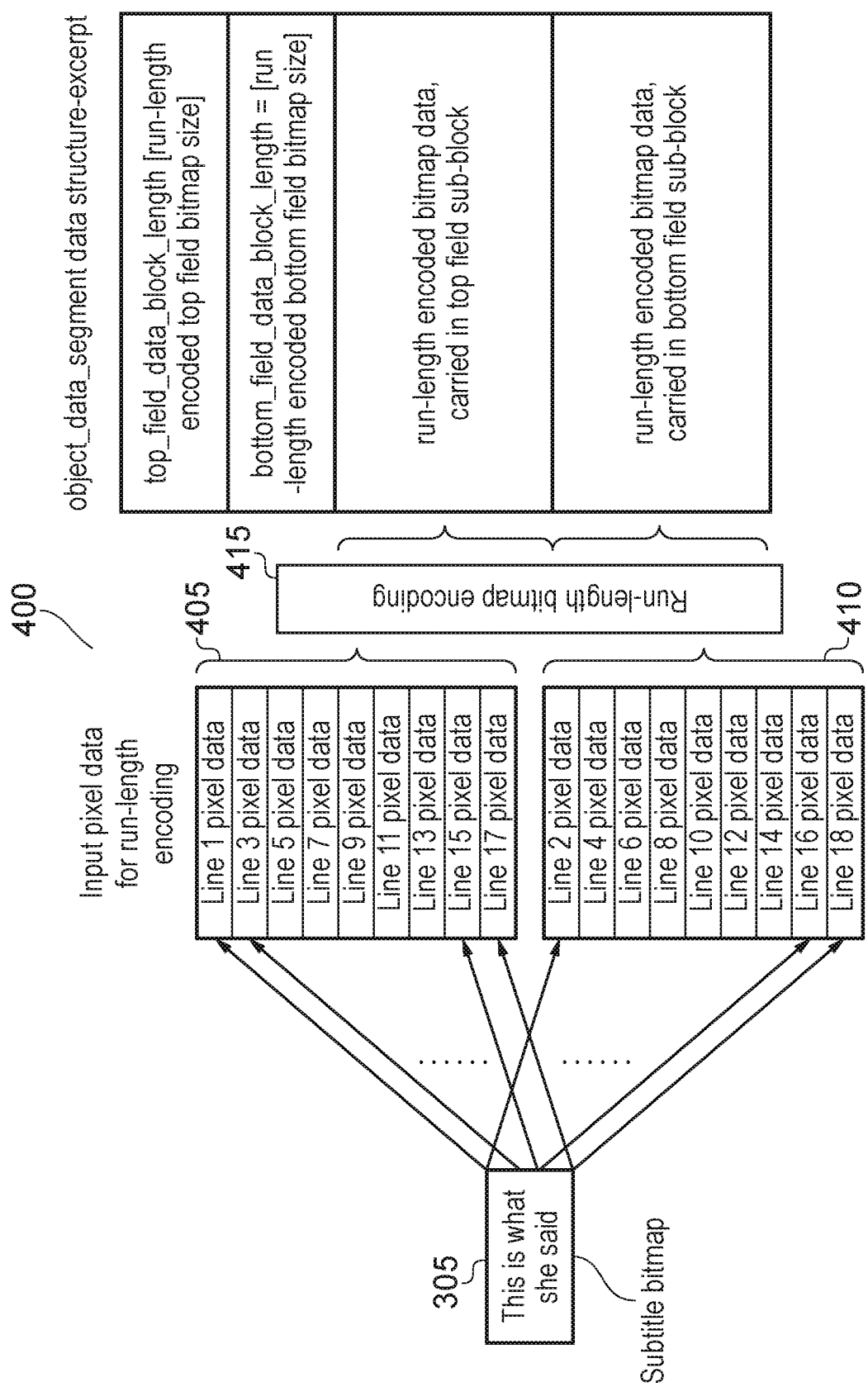
FIG. 4 shows a schematic diagram of the known interlaced type scan subtitle encoding process 400.

FIG. 4 shows a schematic diagram of the known interlaced type scan subtitle encoding process 400. The subtitle bitmap 305 is divided into a top field 405 and a bottom field 410. In the top field 405, the odd numbered pixel lines are encoded and in the bottom field the even numbered pixel lines are encoded. FIG. 4 depicts the subtitle bitmap input data as a series of lines mimicking the shape of the subtitle bitmap. This is just for convenience, since it is known that each pixel-data sub-block is a contiguous series of byte values, with no delineation according to the shape of the bitmap subtitle. These lines of pixel data are then run-length encoded according to the known method in [1] at 415 and carried in the object_data_segment of the DVB Standard set out in [1], with each field's run-length encoded pixel data being carried as two separate fields in the respective sub-blocks. The subtitle bitmaps may also be delivered to receivers without the step of applying run-length encoding or similar simple compression techniques.

FIG. 5 shows the syntax of the object_data_segment using the interlaced type scan. As is seen, the block length of the top field is identified in the top_field_data_block_length 505 and the block length of the bottom field is identified in the bottom_field_data_block_length 510. Moreover, there is a reserved bit 510 which in the known object_data_segment is not allocated.

In this known syntax, therefore, even progressive-scan subtitle bitmaps are pre-processed for carriage in the object_data_segment structure as interlace-scan bitmaps and transmitted as interlace-scan type bitmaps. The television receiver 100 has to then decode the interlace-scan type bitmaps and transform them into progressive scan type bitmaps for display.

Figure 6:
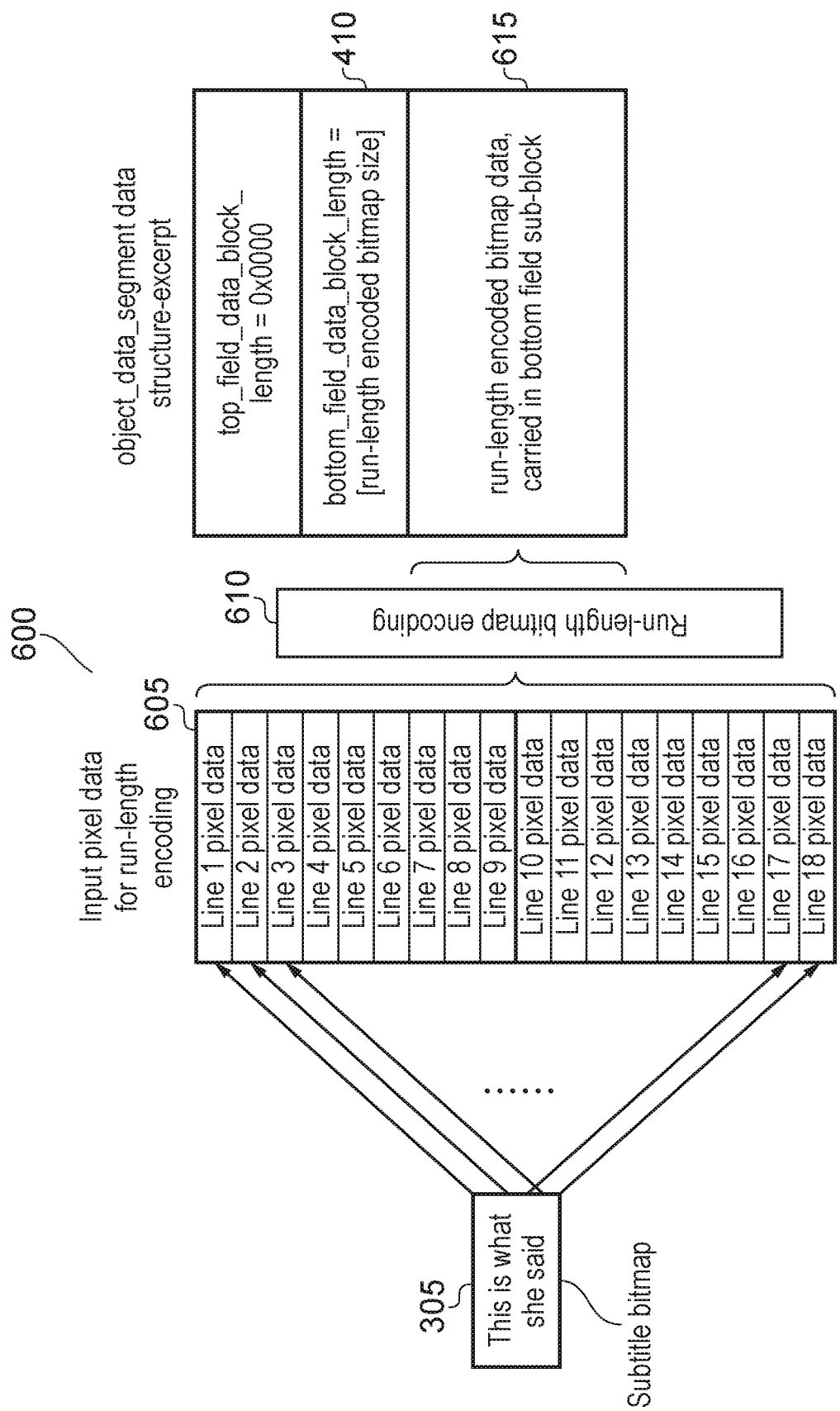
FIG. 6 shows a schematic diagram of a progressive type scan subtitle encoding process 600 according to embodiments of the disclosure.

FIG. 6 shows a schematic diagram of a progressive type scan subtitle encoding process 600 according to embodiments of the disclosure. The subtitle bitmap 305 is divided into its lines of pixel data for progressive type scan. FIG. 6 depicts the subtitle bitmap input data as a series of lines mimicking the shape of the subtitle bitmap. This is just for convenience, since it is known that each pixel-data sub-block is a contiguous series of byte values, with no delineation according to the shape of the bitmap subtitle.

These lines of pixel data are then run-length encoded according to the known method in [1] at 610 and carried in the bottom field of the object_data_segment at 615.

In order that the subtitle decoder 110 understands that the received subtitle bitmap is a progressive type scan, the top_field_block_length is set to 0 (zero). In other words, the value of the top_field_block_length is 0x0000. The bottom_field_data_block_length is then set to the bitmap size and the entire content of the bitmap in the progressive scan format is sent in the bottom field.

Of course, although FIG. 6 shows the subtitle bitmap being sent in the bottom field, it is envisaged that the subtitle bitmap may be sent in the top field. In this instance, the subtitle bitmap 305 will again be divided into its lines of pixel data for progressive type scan. These lines of pixel data are however then encoded in the top field of the object_data_segment.

In order that the subtitle decoder 110 understands that the received subtitle bitmap is a progressive type scan, the reserved bit 510 will be re-defined to signal that the object data segment carries a progressive scan bitmap subtitle. This is because [1] already includes the option for setting the bottom_field_block_length to the value of zero. In the known object data segment, setting the bottom_field_block_length to 0 (zero) means that the top field pixel data is valid for the bottom field, and so effectively repeating the top filed pixel data in the bottom field.

Therefore, in the instance that the value of the bottom_field_block_length is 0x0000, the reserved bit will need to change to a progressive_scan_bitmap bit as will be explained with reference to FIG. 7. Of course, although defining the top_filed_block_length as 0x0000 (zero) would be sufficient to indicate the progressive-type scan and the subtitle bitmap being contained in the bottom field, the progressive_scan_bitmap bit may also be used when the subtitle bitmap is sent in the bottom field.

Continuing with the explanation of the subtitle bitmap being sent in the top field, the top_field_data_block_length is then set to the run-length encoded bitmap size and the entire content of the run-length encoded bitmap in the progressive scan format is sent in the top field.

FIG. 7 shows the object_data_segment structure 700 according to embodiments of the disclosure. In the object_data_segment structure 700 according to embodiments of the disclosure, the reserved bit of FIG. 5 is changed to a progressive_scan_bitmap bit 705.

The progressive_scan_bitmap bit may be defined as follows.

Progressive Scan Bitmap: When set to "1", the pixel data contained in the top field pixel-data sub-block corresponds to a progressively scanned bitmap and no data is contained in the bottom field pixel-data sub-block, hence the field bottom_field_data_block_length shall be set to the value "0x0000". In this case the previously defined case of bottom_field_data_block_length containing the value "0x0000", meaning the bottom field pixel data is the same as the top field pixel data, does not apply. When progressive_scan_bitmap is set to "0", the subtitle bitmap shall consist of top and bottom fields, and when no pixel data is sent in the bottom field, i.e. bottom_field_data_block_length is set to the value "0x0000", then the data for the top field shall be valid for the bottom field also.

Figure 8:
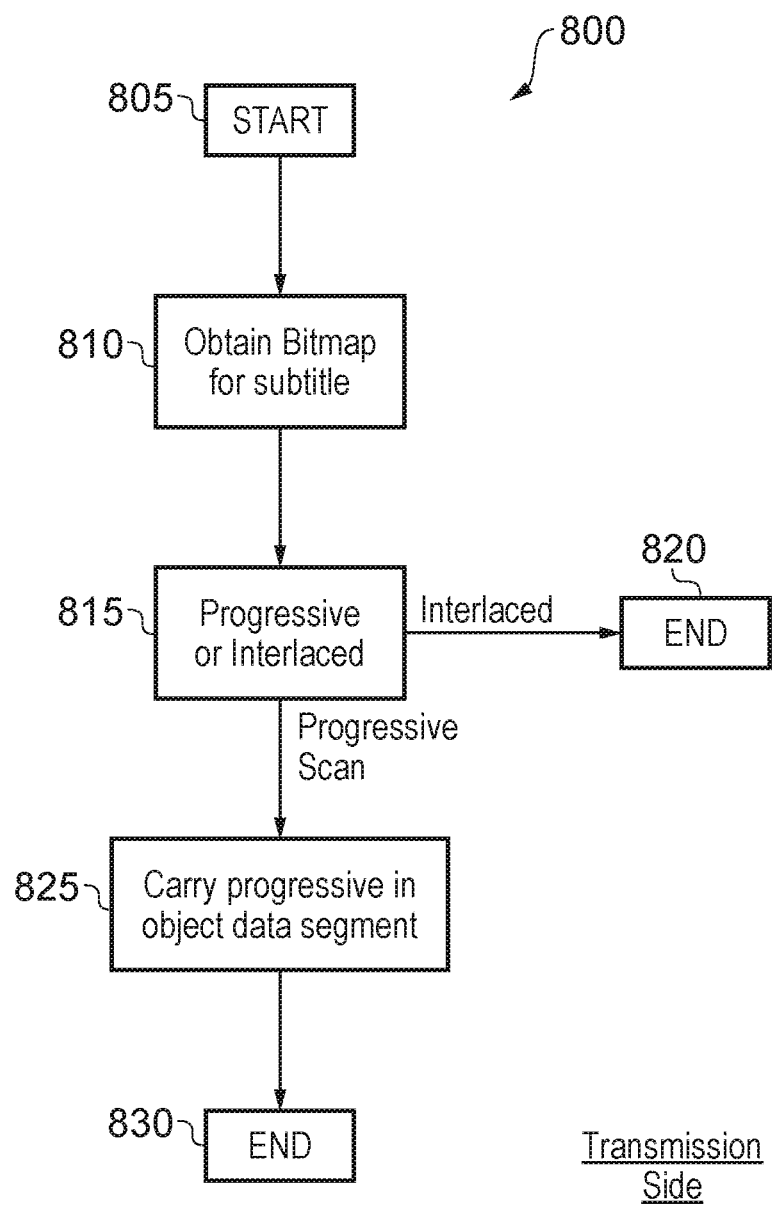
FIG. 8 shows a flow chart 800 explaining a process carried out in the subtitle encoder 210 according to embodiments of the disclosure.

FIG. 8 shows a flow chart 800 explaining a process carried out in the subtitle encoder 210. The process 800 starts at step 805. The subtitle bitmap is then obtained in step 810. It is determined at step 815 if the subtitle bitmap is to be an interlaced-type scan the process proceeds in the known manner and ends at step 820. However, if the subtitle bitmap is to be progressive-type scan, the process moves to step 825.

In step 825 it is determined whether the subtitle bitmap is to be carried in the top field or the bottom field. If the subtitle bitmap is to be carried in the bottom field, the top_field_block_length in the object segment data is set to 0x0000 and the bottom_field_data_block_length is set to the bitmap size. Optionally, the progressive_scan_bitmap bit may also be set. The subtitle bitmap is then carried in a progressive type scan in the bottom field.

If the subtitle bitmap is to be carried in the top field, the bottom_field_block_length in the object segment data is set to 0x0000 and the top_field_data_block_length is set to the bitmap size. In this case, the progressive_scan_bitmap bit is also set. The subtitle bitmap is then carried in a progressive type scan in the top field.

The process ends at step 830 when the subtitle bitmap is sent.

Figure 9:
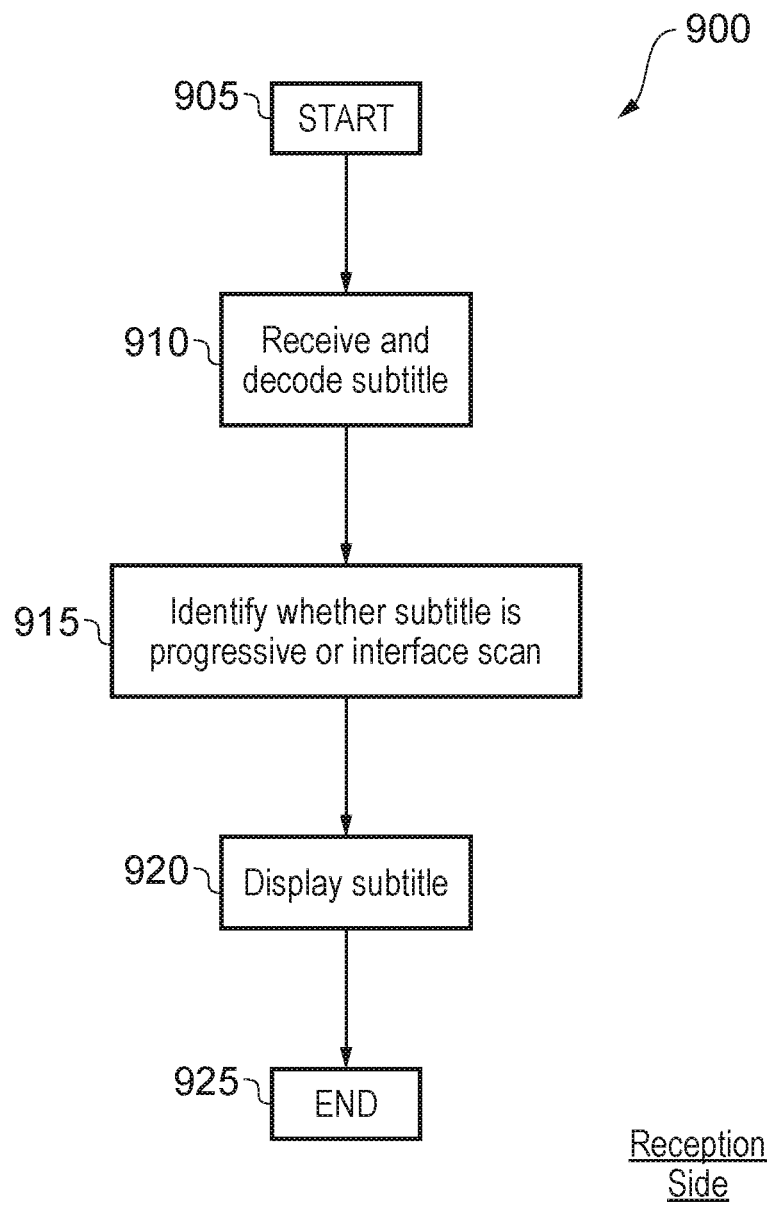
FIG. 9 shows a flow chart 900 explaining a process carried out in the subtitle decoder 110 according to embodiments of the disclosure.

FIG. 9 shows a flow chart 900 explaining a process carried out in the subtitle decoder 110. The process starts at step 905. The television receiver 100 receives the encoded television signal. This is received and decoded in step 910.

The subtitle decoder 110 then identifies whether the subtitle is carried in a progressive or interlaced type scan in step 915.

In order to determine that the subtitle bitmap is sent as a progressive type scan, the subtitle decoder 110 identifies whether the top_field_block_length is set to 0x000 and the bottom_field_block_length is set to a non-zero value. In this case, the subtitle decoder 110 may optionally also identify whether the progressive_scan_bitmap bit is set. In this instance, the subtitle decoder 110 knows that the subtitle bitmap is progressive type scan and sent in the bottom field.

Alternatively, the subtitle decoder 110 may identify whether the bottom_field_block_length is set to 0x000 and the top_field_block_length is set to a non-zero value. In this case, the subtitle decoder 110 will also identify whether the progressive_scan_bitmap bit is set. In this instance, if the progressive_scan_bitmap is set, the subtitle decoder 110 knows that the subtitle bitmap is progressive type scan and sent in the top field.

Alternatively, if the progressive_scan_bitmap is not set, the subtitle decoder 110 knows that subtitle bitmap is interlace scan and the top field pixel data is valid for the bottom field pixel data.

Of course, if neither the top_field_block length or the bottom_field_block length are set to 0x000, then the subtitle decoder 110 knows that the subtitle bitmap is interlace scan.

The subtitle is then displayed in step 920 and the process ends in step 925.

Although the above describes sending the bitmap in either the top or bottom field in its entirety, the disclosure is not so limited. Indeed, the subtitle bitmap may be split and carried in both the top field and the bottom field. For example, the presence of the progressive_scan_bitmap bit may indicate that the upper half of the subtitle bitmap is carried in the top field and the lower half carried in the bottom field. In this instance, the top_field_block_length and the bottom_field_block_length would both be non-zero values and the progressive_scan_bitmap bit would identify solely that the subtitle bitmap is progressive type scan and carried in the top field and bottom field in a predetermined manner. This may be predetermined by the Standard or in another manner In this case, the definition of the pregressive_scan_bitmap bit may change to also include that when set, and the value of top_field_block_length and bottom_field_block_length are non-zero, then the data in the top field will be a first predefined (already established) segment of the bitmap and the data in the bottom field will be a second predefined (already established) segment of the bitmap.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the present technique can generally described by the following numbered clauses:

1. A subtitle encoding device for transmitting a bitmap subtitle for insertion in an image using a progressive type scan comprising a controller configured to:
    indicate, in an interlace subtitle system, that a top field block length is zero; and
    provide the bitmap subtitle in a bottom field of the interlace subtitle system.

2. A subtitle encoding device according to clause 1, wherein the value of a top_field_data_block_length field is set to zero.

3. A subtitle encoding device according to clause 1 or 2, wherein the controller is further configured to:
    set a flag indicating that the bitmap subtitle is for insertion using a progressive type scan.

4. A subtitle encoding device according to clause 3, wherein the value of a progressive_scan_bitmap bit is set as the flag.

5. A subtitle encoding device for transmitting a bitmap subtitle for insertion in an image using a progressive type scan comprising a controller configured to:
    indicate, in an interlace subtitle system, that a bottom field block length is zero;
    set a flag indicating that the bitmap subtitle is for insertion using a progressive type scan; and
    provide the bitmap subtitle in the top field of interlace subtitle system.

6. A subtitle encoding device according to clause 5, wherein the value of a top_field_data_block_length field is set to zero and wherein the value of a progressive_scan_bitmap bit is set as the flag.

7. A subtitle encoding device for transmitting a bitmap subtitle for insertion in an image using a progressive type scan comprising a controller configured to:
    set a flag indicating that the bitmap subtitle is for insertion using a progressive type scan;
    divide the bitmap subtitle into a first and a second predetermined segment; and
    transmit the first predetermined segment in a top field of an interlace subtitle system and the second predetermined segment in a bottom field of the interlace subtitle system.

8. A subtitle encoding device according to clause 7, wherein the value of a progressive_scan_bitmap bit is set as the flag.

9. A subtitle encoding method for transmitting a bitmap subtitle for insertion in an image using a progressive type scan comprising the steps of:
    indicating, in an interlace subtitle system, that a top field block length is zero; and
    providing the bitmap subtitle in a bottom field of the interlace subtitle system.

10. A subtitle encoding method according to clause 9, wherein the value of a top_field_data_block_length field is set to zero.

11. A subtitle encoding method according to clause 9 or 10, further comprising:
    setting a flag indicating that the bitmap subtitle is for insertion using a progressive type scan.

12. A subtitle encoding method according to clause 11, wherein the value of a progressive_scan_bitmap bit is set as the flag.

13. A subtitle encoding method for transmitting a bitmap subtitle for insertion in an image using a progressive type scan comprising the steps of:

indicating, in an interlace subtitle system, that a bottom field block length is zero;

setting a flag indicating that the bitmap subtitle is for insertion using a progressive type scan; and providing the bitmap subtitle in the top field of interlace subtitle system.

14. A subtitle encoding method according to clause 13, wherein the value of a top_field_data_block_length field is set to zero and wherein the value of a progressive_scan_bitmap bit is set as the flag.

15. A subtitle encoding method for transmitting a bitmap subtitle for insertion in an image using a progressive type scan comprising the steps of:

setting a flag, in an interlace subtitle system, indicating that the bitmap subtitle is for insertion using a progressive type scan;

dividing the bitmap subtitle into a first and a second predetermined segment; and transmitting the first predetermined segment in a top field of the interlace subtitle system and the second predetermined segment in a bottom field of the interlace subtitle system.

16. A subtitle encoding method according to clause 15, wherein the value of a progressive_scan_bitmap bit is set as the flag.

17. A subtitle decoding device for receiving a bitmap subtitle for display in an image using a progressive type scan comprising a controller configured to:

identify, from a received interlace subtitle system, that a top field block length is zero; and extract the bitmap subtitle from a bottom field of the interlace subtitle system.

18. A subtitle decoding device according to clause 17, wherein the value of a top_field_data_block_length field is set to zero.

19. A subtitle decoding device according to clause 17 or 18, wherein the controller is further configured to:

identify a flag indicating that the bitmap subtitle is inserted using a progressive type scan.

20. A subtitle encoding device according to clause 19, wherein the value of a progressive_scan_bitmap bit is set as the flag.

21. A subtitle decoding device for receiving a bitmap subtitle for display in an image using a progressive type scan comprising a controller configured to:

identify, from a received interlace subtitle system, that a bottom field block length is zero;

identify a flag indicating that the bitmap subtitle is inserted using a progressive type scan; and extract the bitmap subtitle from the top field of interlace subtitle system.

22. A subtitle decoding device according to clause 21, wherein the value of a top_field_data_block_length field is set to zero and wherein the value of a progressive_scan_bitmap bit is set as the flag.

23. A subtitle decoding device for receiving a bitmap subtitle for display in an image using a progressive type scan comprising a controller configured to:

identify a flag in an interlace subtitle system, indicating that the bitmap subtitle is inserted using a progressive type scan;

extract a first predetermined section of the bitmap subtitle from a top field of the interlace subtitle system and the second predetermined segment in a bottom field of the interlace subtitle system; and combine the first and second predetermined sections.

24. A subtitle decoding device according to clause 23, wherein the value of a progressive_scan_bitmap bit is set as the flag.

25. A subtitle decoding method for receiving a bitmap subtitle for display in an image using a progressive type scan comprising the steps of:

identifying, from a received interlace subtitle system, that a top field block length is zero; and extracting the bitmap subtitle from a bottom field of the interlace subtitle system.

26. A subtitle decoding method according to clause 25, wherein the value of a top_field_data_block_length field is set to zero.

27. A subtitle decoding method according to clause 25 or 26, comprising:

identifying a flag indicating that the bitmap subtitle is inserted using a progressive type scan.

28. A subtitle decoding method according to clause 27, wherein the value of a progressive_scan_bitmap bit is set as the flag.

29. A subtitle decoding method for receiving a bitmap subtitle for display in an image using a progressive type scan comprising the steps of:

identifying, from a received interlace subtitle system, that a bottom field block length is zero;

identifying a flag indicating that the bitmap subtitle is inserted using a progressive type scan; and extracting the bitmap subtitle from the top field of interlace subtitle system.

30. A subtitle decoding method according to clause 29, wherein the value of a top_field_data_block_length field is set to zero and wherein the value of a progressive_scan_bitmap bit is set as the flag.

31. A subtitle decoding method for receiving a bitmap subtitle for display in an image using a progressive type scan comprising the steps of:

identifying a flag in an interlace subtitle system, indicating that the bitmap subtitle is inserted using a progressive type scan;

extracting a first predetermined section of the bitmap subtitle from a top field of the interlace subtitle system and the second predetermined segment in a bottom field of the interlace subtitle system; and combining the first and second predetermined sections.

32. A subtitle decoding method according to clause 31, wherein the value of a progressive_scan_bitmap bit is set as the flag.

33. A computer program product comprising computer readable instructions, which, when loaded onto a computer, configure the computer to perform the method according to any one of clauses 9 to 16 or 25 to 32.

REFERENCE

[1] ETSI TS 300 743 v1.5.1 (2014-01); DVB Digital Video Broadcasting (DVB); Subtitling systems.

The invention claimed is:

1. A subtitle decoding device for receiving a bitmap subtitle for display in an image using a progressive type scan, the subtitle decoding device comprising a controller circuitry configured to:

identify a flag indicating that data inserted into one of a top field or a bottom field of an interlace subtitle system is the bitmap subtitle;

identify, from a received interlace subtitle system, that one of a top field block length or a bottom field block length is zero;

determine that data in the bottom field of the interlace subtitle system is the bitmap subtitle and extract the bitmap subtitle from the bottom field of the interlace subtitle system when the top field block length is zero and the flag is set;

determine that data in the top field of the interlace subtitle system is the bitmap subtitle when the flag is set and the bottom field length is set to zero, and extract the bitmap subtitle from the top field of the interlace subtitle system when the bottom field block length is zero and the flag is set; and determine that the data in a non-zero-length one of the top field and the bottom field of the interlace subtitle system is valid for both the top field and bottom field of the interlace subtitle system when the flag is not set.

2. The subtitle decoding device according to claim 1, wherein the flag is inserted into a reserved bit of the interlace subtitle system.

3. The subtitle decoding device according to claim 1, wherein the subtitle decoding device is included in a television receiver.

4. A subtitle decoding method for receiving a bitmap subtitle for display in an image using a progressive type scan, the subtitle decoding method comprising:

identifying a flag indicating that data inserted into one of a top field or a bottom field of an interlace subtitle system is the bitmap subtitle;

identifying, from a received interlace subtitle system, that one of a top field block length or a bottom field block length is zero;

determining that data in the bottom field of the interlace subtitle system is the bitmap subtitle and extract the bitmap subtitle from the bottom field of the interlace subtitle system when the top field block length is zero and the flag is set;

determining that data in the top field of the interlace subtitle system is the bitmap subtitle when the flag is set and the bottom field length is set to zero, and extract the bitmap subtitle from the top field of the interlace subtitle system when the bottom field block length is zero and the flag is set; and determining that the data in a non-zero-length one of the top field and the bottom field of the interlace subtitle system is valid for both the top field and bottom field of the interlace subtitle system when the flag is not set.

5. A non-transitory computer readable medium including computer program instructions, which when executed by a computer causes the computer to perform the method of claim 4.

* * * * *